United States Patent
Todorovic (10) Patent No.: US 8,938,944 B2
(45) Date of Patent: Jan. 27, 2015

(54) AIRCRAFT GAS-TURBINE ENGINE WITH OIL COOLER IN THE ENGINE COWLING

(75) Inventor: Predrag Todorovic, Berlin (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 448 days.

(21) Appl. No.: 13/468,483

(22) Filed: May 10, 2012

(65) Prior Publication Data

US 2012/0285138 A1 Nov. 15, 2012

(30) Foreign Application Priority Data

May 12, 2011 (DE) .......................... 10 2011 101 342

(51) Int. Cl.
| | |
|---|---|
| *F02K 99/00* | (2009.01) |
| *F02K 3/02* | (2006.01) |
| *F02K 1/54* | (2006.01) |
| *B63H 11/10* | (2006.01) |
| *F01D 25/18* | (2006.01) |
| *F02C 7/14* | (2006.01) |
| *F02K 1/72* | (2006.01) |
| *B64D 29/00* | (2006.01) |
| *B64D 33/10* | (2006.01) |

(52) U.S. Cl.
CPC ... *F02C 7/14* (2013.01); *F02K 1/72* (2013.01); *B64D 29/00* (2013.01); *B64D 33/10* (2013.01); *F05D 2260/20* (2013.01); *Y02T 50/676* (2013.01)
USPC .... 60/267; 60/226.2; 244/110 B; 239/265.19; 184/6.11

(58) Field of Classification Search
USPC ..................... 60/266, 267, 226.2, 228, 39.08; 244/110 B; 239/265.19, 265.25, 239/265.27, 265.29, 265.31; 184/6.11
See application file for complete search history.

(56) References Cited

U.S. PATENT DOCUMENTS

| | | | | |
|---|---|---|---|---|
| 3,303,653 | A | * | 2/1967 | Hull, Jr. .......................... 60/229 |
| 4,742,961 | A | | 5/1988 | Starke |
| 8,061,649 | B2 | | 11/2011 | Journade et al. |
| 2007/0044451 | A1 | | 3/2007 | Jones |
| 2008/0006021 | A1 | * | 1/2008 | Schwarz ......................... 60/204 |
| 2009/0188232 | A1 | * | 7/2009 | Suciu et al. .................. 60/39.83 |
| 2009/0301057 | A1 | | 12/2009 | Bulin et al. |

(Continued)

FOREIGN PATENT DOCUMENTS

| | | |
|---|---|---|
| DE | 60313394 | 1/2008 |
| EP | 1944475 | 7/2008 |

(Continued)

OTHER PUBLICATIONS

German Search Report dated Feb. 15, 2012 from counterpart application.

(Continued)

*Primary Examiner* — Gerald L Sung
(74) *Attorney, Agent, or Firm* — Timothy J. Klima; Shuttleworth & Ingersoll, PLC (57) ABSTRACT

The present invention relates to an aircraft gas-turbine engine with a core engine surrounded by a bypass duct, with a radially outer engine cowling enclosing the bypass duct and being provided at its rear region with a thrust-reversing device which is moveable relative to the engine cowling, with at least one cooler element extending over at least part of the circumference being arranged in the intermediate area between the engine cowling and the thrust-reversing device.

20 Claims, 7 Drawing Sheets

(56) References Cited

U.S. PATENT DOCUMENTS

2010/0270428 A1 10/2010 Murphy
2012/0237332 A1 9/2012 Bulin et al.

FOREIGN PATENT DOCUMENTS

| EP | 2009260 | 12/2008 |
|----|---------|---------|
| EP | 2011988 | 1/2009 |
| EP | 2243945 | 10/2010 |
| GB | 2234805 | 2/1991 |
| WO | 2010/136710 | 12/2010 |

OTHER PUBLICATIONS

European Search Report dated Apr. 8, 2014 from counterpart App No. 12003733.8.

* cited by examiner

AIRCRAFT GAS-TURBINE ENGINE WITH OIL COOLER IN THE ENGINE COWLING

This application claims priority to German Patent Application DE102011101342,7 filed May 12, 2011, the entirety of which is incorporated by reference herein.

This invention relates to an aircraft gas-turbine engine with a core engine surrounded by a bypass duct. The bypass duct is enclosed by a radially outer engine cowling, at the rear region of which a thrust-reversing device is provided which is moveable relative to the engine cowling.

It is known from the state of the art to attach heat exchangers either to the core engine or to the casing of the fan or in the region of struts in the bypass duct. It is known here to use either matrix coolers with a plurality of flow ducts or surface coolers with an enlarged surface.

The designs known from the state of the art require in each case an adaptation of the dimensions of the casing, with the latter in many cases having to be axially extended on account of the oil coolers. This has the disadvantageous result of higher weight and also hinders access to radially inward assemblies. The use of coolers inside the casing of the fan or in the region of struts or stator vanes inside the bypass duct impairs the design of thrust reverser cascades and proves unfavourable for that reason too.

A further disadvantage resulting from the designs known from the state of the art is that modern gas-turbine engines with a high bypass flow ratio require larger oil coolers and heat exchangers, which in the known designs can only be installed at great expense or not at all, since the installation space required is not available or is available only to a limited extent.

The known designs are thus characterized by high weight, increased size and design-related drawbacks.

A broad aspect of the present invention is to provide an aircraft gas-turbine engine of the type specified at the beginning which, while being simply designed and easily and cost-effectively producible, can effectively be provided with a heat exchanger or oil cooler, respectively, and/or a pre-cooler (air cooled air cooler).

It is a particular object of the present invention to provide solution to the above problems by a combination of the features described herein Further advantageous embodiments of the present invention will become apparent from the present description.

It is thus provided in accordance with the invention that in an intermediate area between the inflow-side engine cowling and the thrust-reversing device at least one cooler element (heat exchanger, oil cooler) is arranged extending over at least part of the circumference.

The design in accordance with the present invention is characterized by a variety of considerable advantages. Initially it is possible to design the cooler element substantially annular, so that it can have a large volume and a large heat transfer capacity. This distinguishes the present invention considerably from solutions known from the state of the art, which provide in each case singular cooler elements.

A further substantial advantage is that the cooler element in accordance with the present invention is arranged at an intermediate area between the thrust-reversing device and the front engine cowling. In the flight state, in which the thrust-reversing device is not activated, the recurring problem is a radially outward residual flow from the bypass duct between the engine cowling and the thrust-reversing device. In accordance with the invention, this flow can thus be used for heat exchange, since the cooler element in accordance with the invention is arranged in this region of exiting airflow. It is possible by suitable measures to achieve a very effective cooling in the flight state, where the air quantity discharged from the bypass duct can be precisely determined by the design of the gap between the engine cowling and the thrust-reversing device. The solution in accordance with the invention is thus distinguished by a high efficiency which is very advantageous particularly in modern engine designs having a high cooling requirement. Engine designs of this type have for example a fan driven by a gearbox or additional electrical units.

It is particularly favourable in accordance with the invention when the cooler element is arranged at the outflow region of the engine cowling. This results in an effective flow through the cooler element even when the thrust-reversing device is activated. It can also be advantageous to provide the cooler element with at least one air-guiding element that passes the airflow effectively through the cooler element or over its surface even when the thrust-reversing device is activated.

With the arrangement of the cooler element in accordance with the invention at a radially very far outward position in the region of the engine cowling, it is possible to provide the latter with a smaller cross-section, allowing the size to be reduced overall without impairing the heat exchange.

It is furthermore favourable that the positioning of the cooler element in accordance with the invention is optimized in respect of the pressures occurring. This means that at the radially outer surface of the engine cowling (nacelle) a minimum static pressure results, while in this region the pressure inside the bypass duct is high, in particular also due to the nozzle-like design of the bypass duct provided downstream.

The arrangement of the cooler element in accordance with the invention and its integration in the area of thrust reverser cascades furthermore leads to the advantageous effect that flow-guiding elements of the cascades can be used as guide ducts and sealing elements for the cooler element when the thrust-reversing device is in its deactivated position.

A further advantage results from the cooler element being readily accessible for maintenance work when the thrust-reversing device is activated.

It is thus possible in accordance with the invention to provide very large cooler elements with a high efficiency, which are particularly suitable especially for gas-turbine engines with a fan driven by a gearbox and/or with additional electrical units. In accordance with the invention, the result is a complete integration of the cooler element into the cascade structure of the thrust-reversing device. Due to the embodiment in accordance with the invention, other partial areas of the gas-turbine engine which were previously occupied by cooler elements (heat exchangers, oil coolers etc.) are freed up for other design tasks.

The present invention is described in the following in light of the accompanying drawing, showing exemplary embodiments. In the drawing.

In the following description, identical parts are provided with the same reference numerals in the various exemplary embodiments. Furthermore, the terms cooler element, heat exchanger and oil cooler are regarded as equivalent.

Figure 1:
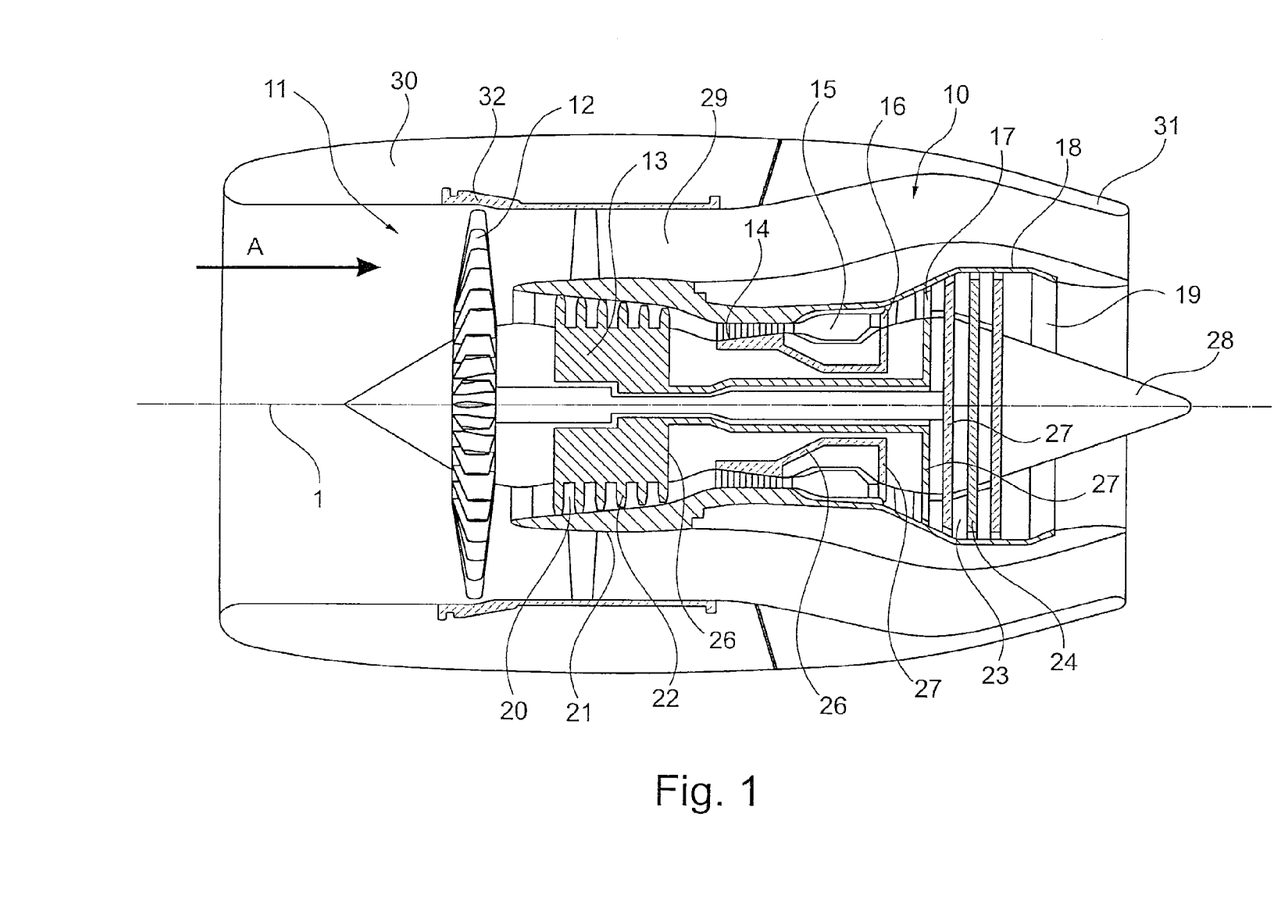
FIG. 1 shows a schematic representation of a gas-turbine engine in accordance with the present invention.

The gas-turbine engine 10 in accordance with FIG. 1 is an example of a turbomachine where the invention can be used. The following however makes clear that the invention can also be used in other turbomachines. The engine 10 is of conventional design and includes in the flow direction, one behind the other, an air inlet 11, a fan 12 rotating inside a casing, an intermediate-pressure compressor 13, a high-pressure compressor 14, combustion chambers 15, a high-pressure turbine 16, an intermediate-pressure turbine 17 and a low-pressure turbine 18 as well as an exhaust nozzle 19, all of which being arranged about a central engine axis 1.

The intermediate-pressure compressor 13 and the high-pressure compressor 14 each include several stages, of which each has an arrangement extending in the circumferential direction of fixed and stationary guide vanes 20, generally referred to as stator vanes and projecting radially inwards from the engine casing 21 in an annular flow duct through the compressors 13, 14. The compressors furthermore have an arrangement of compressor rotor blades 22 which project radially outwards from a rotatable drum or disk 26 linked to hubs 27 of the high-pressure turbine 16 or the intermediate-pressure turbine 17, respectively.

The turbine sections 16, 17, 18 have similar stages, including an arrangement of fixed stator vanes 23 projecting radially inwards from the casing 21 into the annular flow duct through the turbines 16, 17, 18, and a subsequent arrangement of turbine blades 24 projecting outwards from a rotatable hub 27. The compressor drum or compressor disk 26 and the blades 22 arranged thereon, as well as the turbine rotor hub 27 and the turbine rotor blades 24 arranged thereon rotate about the engine axis 1 during operation.

Reference numeral 28 designates an exhaust cone. FIG. 1 furthermore shows a bypass duct 29 and an engine cowling 30 which surrounds in particular the inflow region (air inlet) 11. A thrust-reversing device is illustrated schematically with the reference numeral 31. The reference numeral 32 shows a fan casing.

Figure 2:
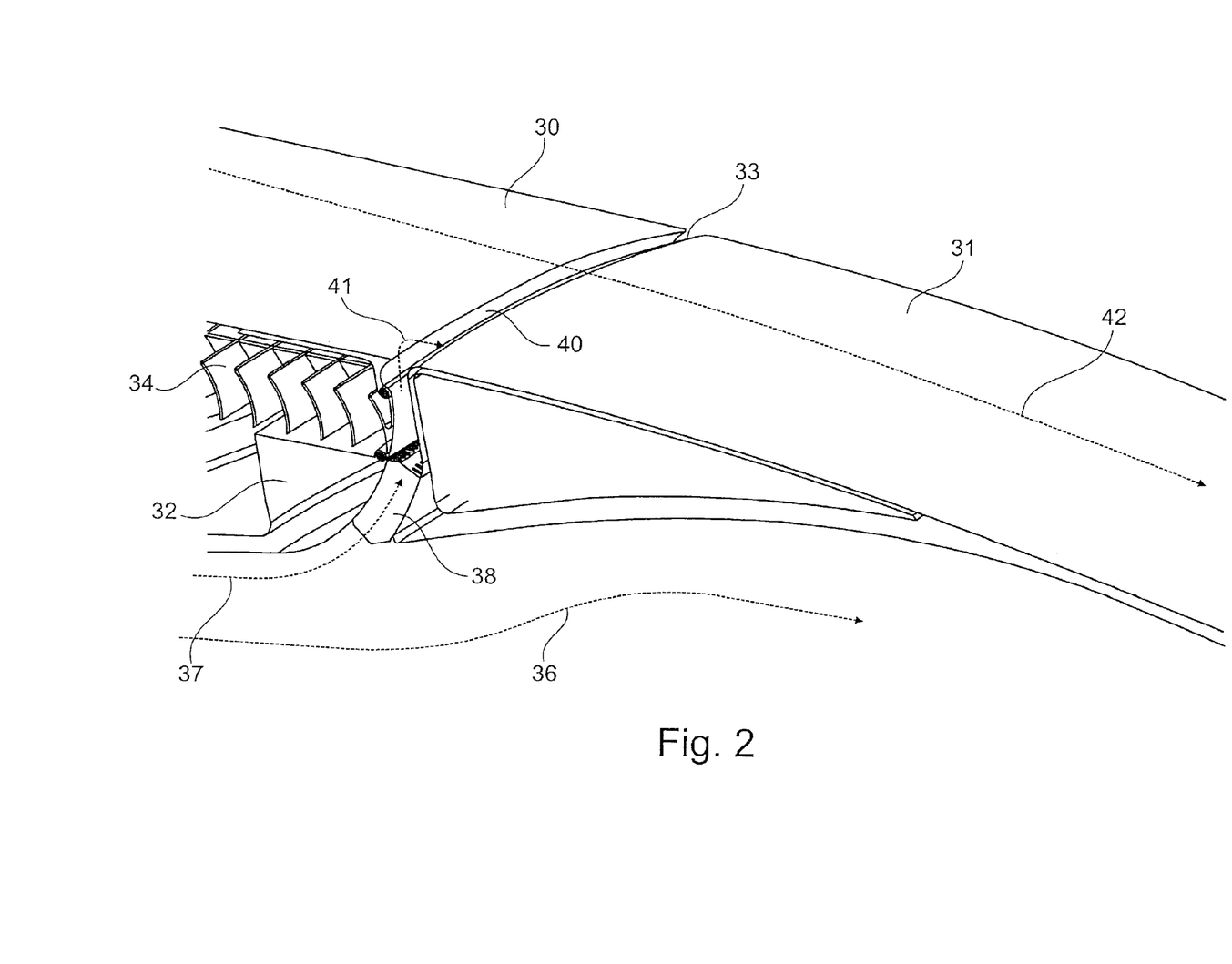
FIG. 2 shows a simplified detail view of the cooler element in accordance with the present invention designed as a double-acting surface heat exchanger.
Figure 3:
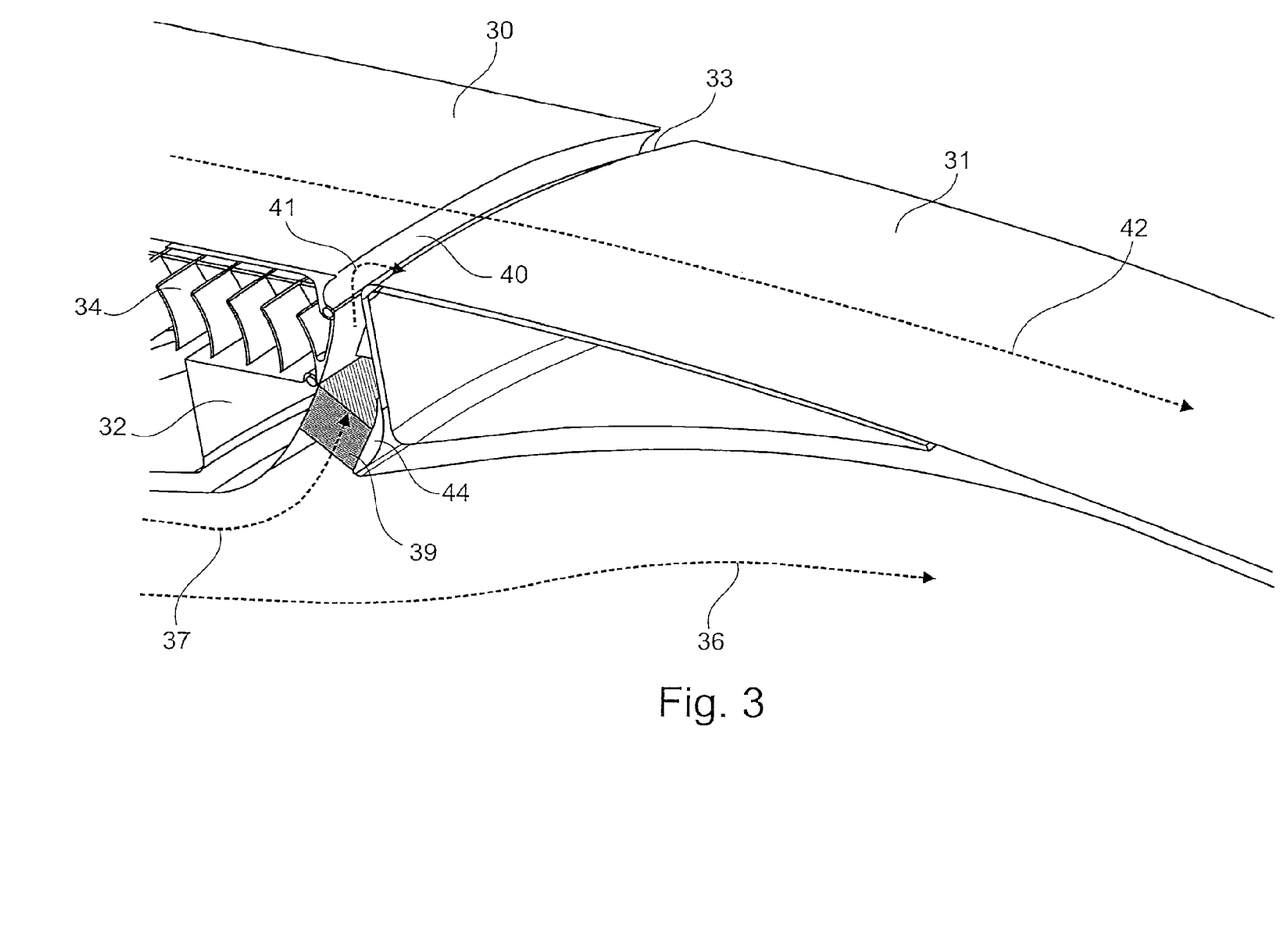
FIG. 3 shows a view, by analogy with FIG. 2, of the cooler element designed as matrix heat exchanger.

FIGS. 2 and 3 show in a perspective partial view the outflow region of the engine cowling 30 with an outflow edge 33. This is adjoined in the flow direction by the thrust-reversing device 31, which, as known from the state of the art, has cascades 34 which in the activated state of the thrust-reversing device 31, i.e. moved rearwards in the axial direction, act as flow-guiding elements for a thrust-reversing flow 35 (see FIGS. 6 and 7).

FIGS. 2 and 3 furthermore show a bypass duct flow 36 in the deactivated and closed state of the thrust-reversing device 31, and a heat exchanger inlet flow 37 diverted from the bypass duct 29. The heat exchanger inlet flow 37 flows through a double surface heat exchanger 38 (FIG. 2) and, in an alternative exemplary embodiment, a matrix heat exchanger 39 (FIG. 3). The heat exchangers 38, 39 here form cooler elements, which are (not shown) passed by oil ducts in order to cool the oil. Alternatively to this, it is also possible in accordance with the invention to cool other media using the cooler elements 38, 39.

The cooler elements 38, 39 are arranged in a gap 40 through which the heat exchanger inlet flow flows out as heat exchanger outlet flow 41 (FIGS. 2 and 3). The heat exchanger outlet flow 41 mixes in the following with an engine cowling outer flow 42.

Figure 4:
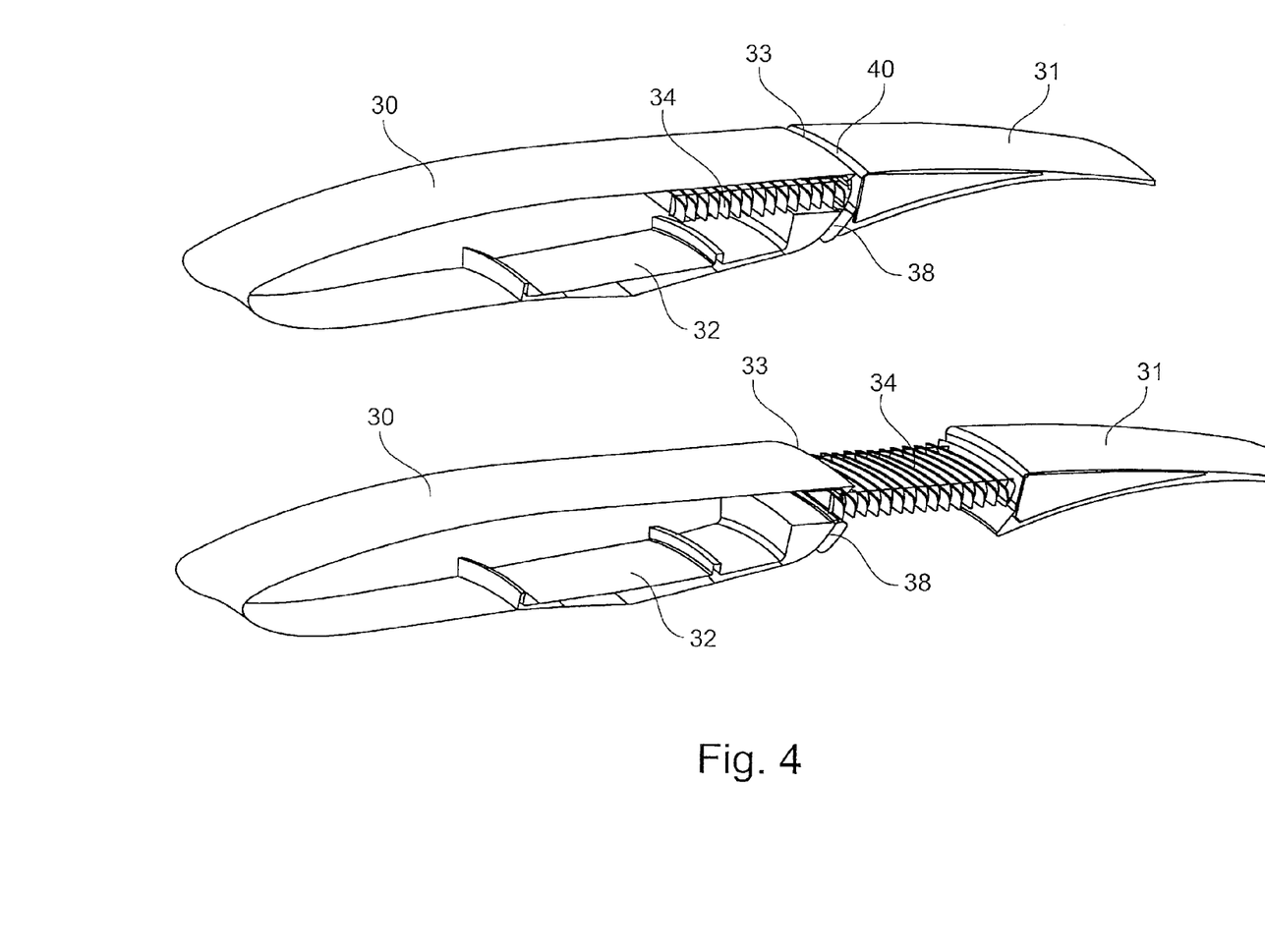
FIG. 4 shows simplified representations, by analogy with FIG. 2, of the thrust reverser unit (TRU) in the deactivated state (top) and in the activated state (bottom)
Figure 5:
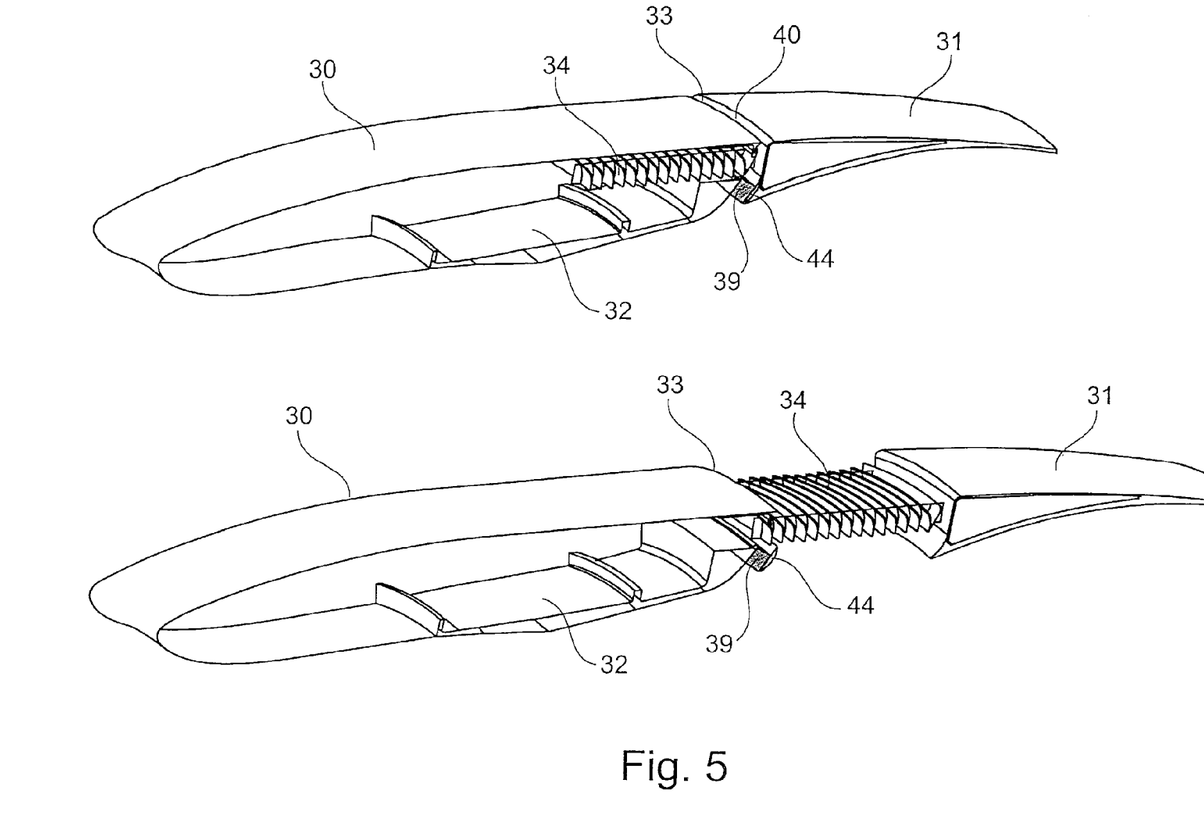
FIG. 5 shows a view, by analogy with FIG. 4, of the matrix heat exchanger shown in FIG. 3.
Figure 6:
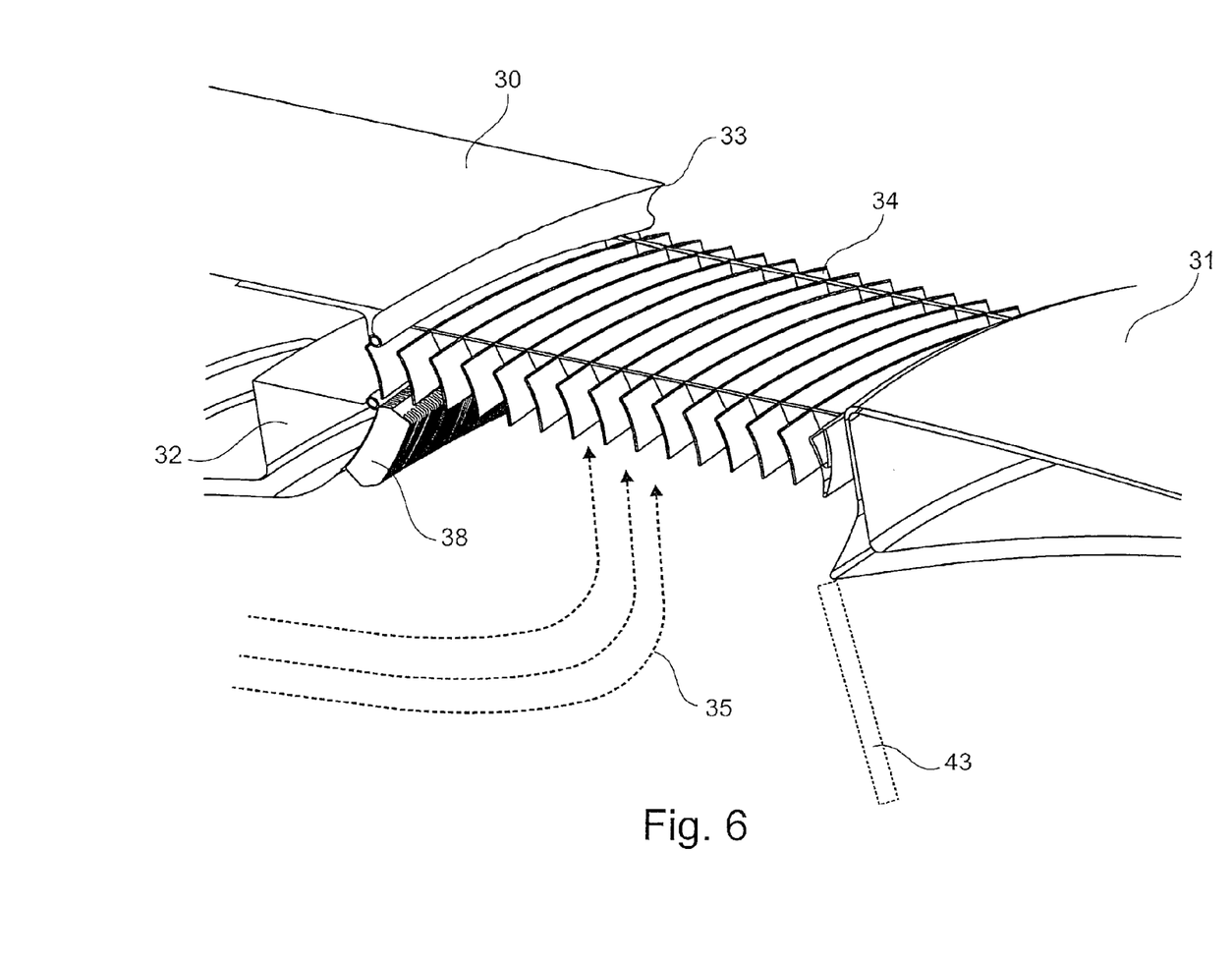
FIG. 6 shows a detail view, by analogy with FIG. 2, of the double surface heat exchanger with the thrust-reversing device in the activated state.
Figure 7:
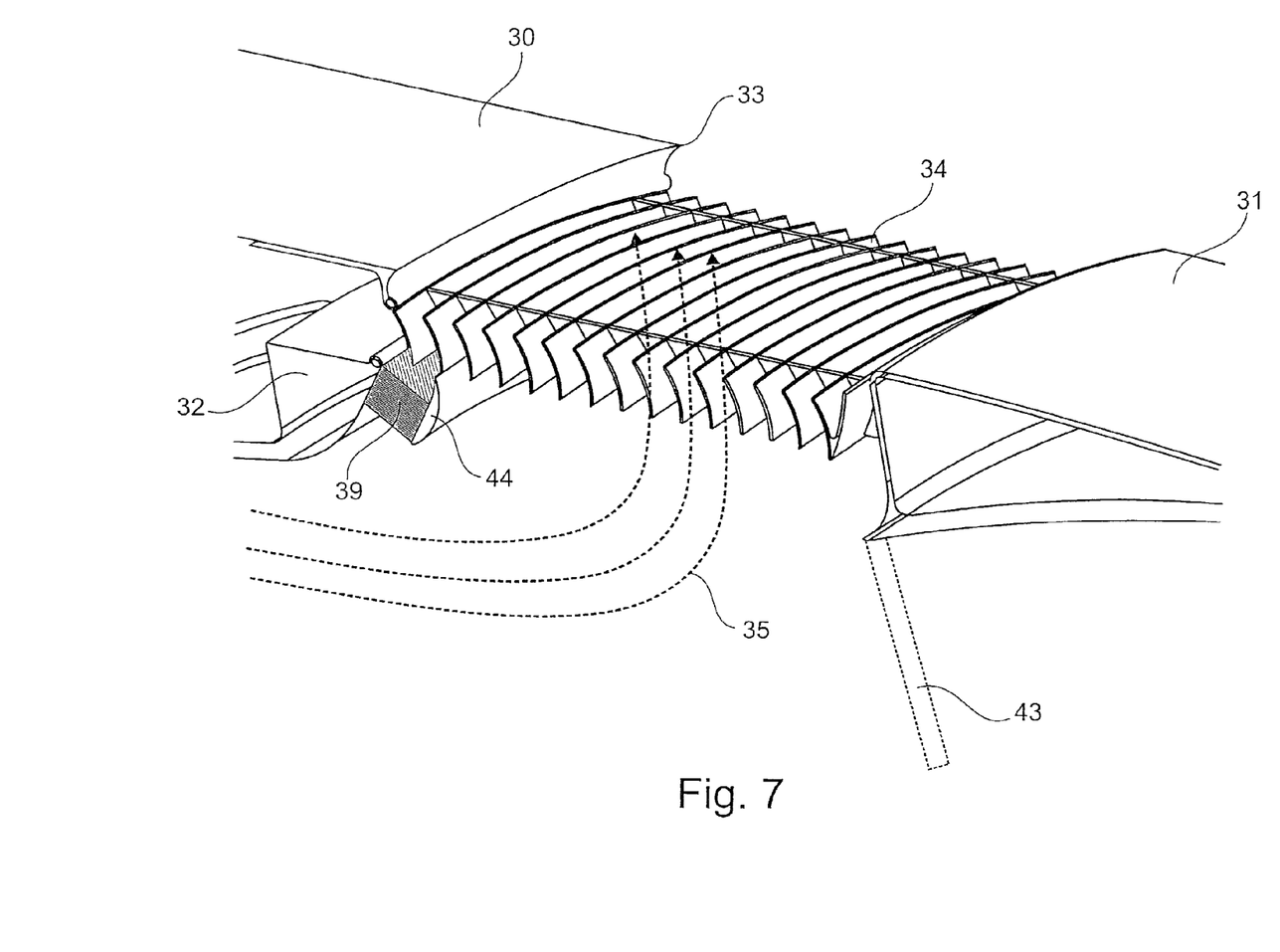
FIG. 7 shows a representation, by analogy with FIG. 6, with a matrix heat exchanger.

The top illustrations in FIGS. 4 and 5 show in a more complete view the situations of FIGS. 2 and 3, respectively. The bottom illustrations in FIGS. 4 and 5 show the situations with the thrust-reversing device 31 activated, in which the cascades 34 are extended to affect the flow, as shown in FIGS. 6 and 7. It can be seen here that the thrust-reversing flow 35, which is in particular diverted by thrust reverser doors 43 and passed to the outside through the cascades 34, flows through the cooler element 38 or 39, respectively, in an effective way. In particular in the matrix heat exchanger 39 illustrated in FIG. 7, an additional flow-guiding element 44 can be provided to increase the flow through the matrix heat exchanger.

List of Reference Numerals

1 Engine axis
10 Gas-turbine engine/core engine
11 Air inlet/inflow region
12 Fan rotating inside the casing
13 Intermediate-pressure compressor
14 High-pressure compressor
15 Combustion chambers
16 High-pressure turbine
17 Intermediate-pressure turbine
18 Low-pressure turbine
19 Exhaust nozzle
20 Guide vanes
21 Engine casing
22 Compressor rotor blades
23 Stator vanes
24 Turbine blades
26 Compressor drum or disk
27 Turbine rotor hub
28 Exhaust cone
29 Bypass duct
30 Engine cowling
31 Thrust-reversing device
32 Fan casing
33 Outflow edge/outflow region
34 Cascade
35 Thrust-reversing flow
36 Bypass duct flow
37 Heat exchanger inlet flow
38 Double surface heat exchanger/cooler element
39 Matrix heat exchanger/cooler element
40 Gap/intermediate area
41 Heat exchanger outlet flow
42 Engine cowling outer flow
43 Thrust reverser door
44 Flow-guiding element

What is claimed is:

1. An aircraft gas-turbine engine comprising:
a core engine surrounded by a bypass duct,
a radially outer engine cowling enclosing the bypass duct,
a thrust-reversing device provided at a rear region of the engine cowling which is moveable relative to the engine cowling,
a cooler element extending over at least part of a circumference of the gas-turbine engine being axially positioned in a gap between a rearward edge of the engine cowling and an adjacent forward edge of the thrust-reversing device and radially positioned between the bypass flow duct and an outer surface of the engine cowling.

2. The aircraft gas-turbine engine in accordance with claim 1, wherein the cooler element is at least one chosen from a surface cooler and a matrix cooler.

3. The aircraft gas-turbine engine in accordance with claim 1, wherein the cooler element is mounted on the engine cowling which forms a casing of a fan.

4. The aircraft gas-turbine engine in accordance with claim 1, wherein the cooler element is arranged at an outflow region of the engine cowling.

5. The aircraft gas-turbine engine in accordance with claim 1, and further comprising a flow-guiding element combined with the cooler element.

6. The aircraft gas-turbine engine in accordance with claim 2, wherein the cooler element is mounted on the engine cowling which forms a casing of a fan.

7. The aircraft gas-turbine engine in accordance with claim 6, wherein the cooler element is arranged at an outflow region of the engine cowling.

8. The aircraft gas-turbine engine in accordance with claim 7, and further comprising a flow-guiding element combined with the cooler element.

9. The aircraft gas-turbine engine in accordance with claim 2, wherein the cooler element is arranged at an outflow region of the engine cowling.

10. The aircraft gas-turbine engine in accordance with claim 9, and further comprising a flow-guiding element combined with the cooler element.

11. The aircraft gas-turbine engine in accordance with claim 2, and further comprising a flow-guiding element combined with the cooler element.

12. The aircraft gas-turbine engine in accordance with claim 3, and further comprising a flow-guiding element combined with the cooler element.

13. An aircraft gas-turbine engine comprising:
a core engine surrounded by a bypass duct,
a radially outer engine cowling enclosing the bypass duct,
a thrust-reversing device provided at a rear region of the engine cowling which is moveable relative to the engine cowling,
a cooler element extending over at least part of a circumference of the gas-turbine engine being arranged in an intermediate area between the engine cowling and the thrust-reversing device,
the cooler element being located at an axial point between a distal end of the engine cowling and the thrust-reversing device and at a radial position between an inner surface and an outer surface of the engine cowling.

14. The aircraft gas-turbine engine in accordance with claim 13, wherein the cooler element is at least one chosen from a surface cooler and a matrix cooler.

15. The aircraft gas-turbine engine in accordance with claim 13, wherein the cooler element is mounted on the engine cowling which forms a casing of a fan.

16. The aircraft gas-turbine engine in accordance with claim 13, wherein the cooler element is arranged at an outflow region of the engine cowling.

17. The aircraft gas-turbine engine in accordance with claim 13, and further comprising a flow-guiding element combined with the cooler element.

18. The aircraft gas-turbine engine in accordance with claim 14, wherein the cooler element is mounted on the engine cowling which forms a casing of a fan.

19. The aircraft gas-turbine engine in accordance with claim 18, wherein the cooler element is arranged at an outflow region of the engine cowling.

20. The aircraft gas-turbine engine in accordance with claim 19, and further comprising a flow-guiding element combined with the cooler element.

\* \* \* \* \*